Patented July 5, 1949

2,475,350

UNITED STATES PATENT OFFICE 2,475,350

PURIFICATION OF WATER-SOLUBLE ORGANIC COMPOUNDS

Boyce G. Carson, Woodstown, N. J., assignor to E. I. du Pont de Nemours & Company, Wilmington, Del., a corporation of Delaware No Drawing. Application June 28, 1946, Serial No. 680,057

4 Claims. (Cl. 260—701)

This invention relates to processes for ridding water-soluble organic compounds of certain heavy metal constituents which may be present as impurities but which may be deleterious when present even in minute quantities, and especially to processes wherein thioglycollic acid compounds, such as the acid itself and its alkali-metal salts are used to eliminate the undesirable impurity.

I have discovered that heavy metals which form precipitates by the action of sulfides in acid solution, such as lead, bismuth and copper, can be removed from water solutions of water-soluble organic compounds by suitably treating the solutions of the compounds with thioglycollic acid or the alkali-metal salts thereof. Heretofore it was known that such metals could be removed from oil solutions of oil-soluble organic compounds by the action of thioglycollic acid. It was also known that water-soluble thioglycolates of some of these metals, such as lead, copper, cadmium, mercury and arsenic could be prepared from thioglycollic acid and water-soluble salts of the metals in the presence of soda ash (Journal of Laboratory and Clinical Medicine, vol. 6, pages 359–73). The author states that the lead and copper thioglycolates are unstable. The results obtained by the processes of the present invention are surprising in view of the fact that water-soluble thioglycolates have been prepared from a large number of the metals which in accordance with the present process are removed by the action of thioglycollic acid from solutions of soluble organic compounds which contain the metals in combination.

The principal object of the present invention is to provide water-soluble organic compounds such as dyes, intermediates for dyes and the like, free from objectionable metals. Other objects of the invention will be apparent from the following description.

The objects of the invention are attained by suitably treating an aqueous solution of a water-soluble organic compound with a thioglycollic acid compound, such as the acid or its alkali-metal salt. The thioglycollic acid acts as an agent to eliminate the metals heretofore mentioned, the compounds of which constitute the impurities. The solution of the treated organic compound is clarified by suitable mechanical means, such as filtration. The filtrate contains the purified organic compound which may be salted out and recovered in the form of a filter cake.

The invention will be more fully set forth in the following more detailed description which includes examples that are given as illustrative embodiments of the invention and not as limitations thereof. Parts are expressed in parts by weight unless otherwise noted.

*Example 1*

100 parts of hematoxylin, the dyestuff which is represented by the formula

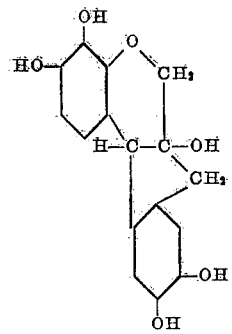

was slurried in 3,000 parts of water and heated to 80°–85° C. The pH value was adjusted to 8.0–8.5 by the addition of soda ash. To this hot solution was added 6.0 parts of sodium thioglycolate. The temperature was maintained at 80°–85° C. for a period of 1½ hours, after which about 10 parts of filtering charcoal was added. After the charcoal was thoroughly stirred into the solution, the solution was filtered. The dye was recovered from the filtrate by adding 25 parts of common salt, allowing the solution to stir until ordinary room temperature was reached, and filtering off the purified dye. Whereas the original dye contained considerable lead salts over that considered to be toxic, the purified dye contained less than 20 parts of lead per million parts of dye. When the dye contained this amount of lead, it was non-toxic. The use of a filter aid which is non-reactive in the medium is desirable but not essential.

Bismuth was removed with equally satisfactory results from a bismuth-containing solution of the same dye by following the above procedure.

*Example 2*

100 parts of the dye obtained by coupling the diazo oxide of 4-nitro-2-aminophenol to 1,3-diamino-benzene-4-sulfonic acid was dissolved in 6,000 parts of water heated to 80°–85° C. To the hot solution was added 12 parts of caustic soda as a 30% solution in water and 12 parts of sodium thioglycolate. The temperature of 80°–85° C. was maintained for 1½ hours after which a filtering aid such as 20 parts of charcoal was added. The solution was stirred for a few minutes and filtered. The dyestuff was recovered from the filtrate by adding common salt and stirring the solution for a few minutes to bring about agglomeration of the dye. The purified dye contained less than 20 parts of lead per million parts of dye, whereas the unpurified dye contained many times this quantity of lead.

*Example 3*

300 parts of the dye represented by the formula

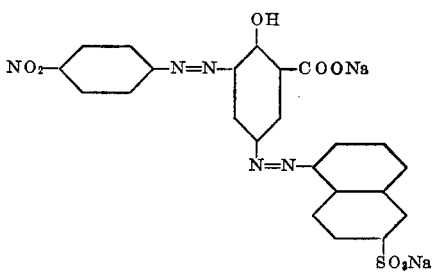

was dissolved in 6,000 parts of water heated to 85° C.–90° C. To the hot solution was added 10 parts of thioglycollic acid. Enough caustic soda solution (25 parts of 2N NaOH solution) was added to adjust the pH to 8.6, and 8 parts more caustic soda was added to bring the dye completely back into solution. A temperature of 85°–95° C. was maintained for a further period of one hour after which the dye solution was clarified by adding charcoal, filtering, and recovering the dye from the solution as in Example 1. Tests with the purified dye showed that its content of heavy metals was insufficient to be considered toxic. The amount of lead present in the product was 14 parts per million of the dyestuff. The unpurified dye contained toxic quantities of lead and other heavy metals.

*Example 4*

100 parts of 1-naphthol-5-sulfonic acid known to contain copper in sufficient quantities to render this intermediate unsuitable for the preparation of dyes for coloring rubber was dissolved in 1500 parts of water containing 20 parts of caustic soda. The temperature of the solution was raised to 80°–85° C. and 4 parts of thioglycollic acid was added. The pH of the solution was adjusted to approximately 8.0 and the solution was kept for one hour at 80°–85° C. Twenty parts of filtering charcoal was now added and, after stirring for a few minutes, the solution was filtered. This solution may be used directly for the preparation of azo dyes for coloring rubber, or the 1-naphthol-5-sulfonic acid may be isolated in known manner. The purified intermediate contained only 1 part copper per million parts of 1-naphthol-5-sulfonic acid by analysis, rendering it suitable for the indicated purpose.

*Example 5*

100 parts of the dye which in the form of its free acid is represented by the formula

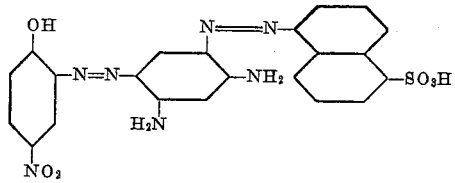

was dissolved in 3,000 parts of water, heated to 80°–85° C. To this solution was added 3 parts of thioglycollic acid and enough caustic soda to adjust the pH of the solution to 7.7. The temperature was maintained at 80°–85° C. for two hours, after which 10 parts of a filtering charcoal was added and the solution was filtered. The purified dye was recovered from the filtrate in the usual manner by the addition of common salt. The resulting dye contained 19 parts of lead per million parts of the dye.

Previous attempts to remove heavy metals from other portions of this dye by means of sodium sulfide in faintly alkaline sollutions had reduced the amount of lead present only to 39 parts per million parts of the dye.

*Example 6*

40 parts of the dye represented by the formula

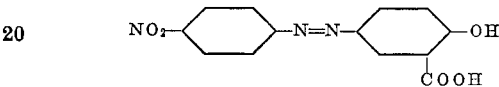

was dissolved in 1200 parts of water heated to 85°–90° C. To the hot solution was added 3 parts of thioglycollic acid and 1.76 parts of caustic soda. The solution was kept at a temperature of 85°–95° C. for 1½ hours after which 10 parts of charcoal were added and the solution was filtered. The purified dye, recovered from the filtrate by the usual method of adding common salt and filtering off the dye, contained 0.49 part lead per million parts of purified dye. The quantities of other heavy metals were reduced proportionately.

The process removes any of the heavy metals of the group consisting of lead, bismuth and copper from aqeuous solutions having pH values of about 2.0 to about 9.5 of any water-soluble organic compound which does not react with thioglycollic acid or its alkali metal salts.

The temperatures of the reaction mixture may be varied widely from about 5° C. to the boiling point of the solutions. The preferred temperatures are about 75° to about 95° C. The pH value of the solutions is not critical so long as the value is at least as high as 2.0. The concentrations of the dye solutions and solutions of intermediates may vary over wide limits. The addition of the thioglycollic acid to the solution of organic compound may take place before the solution is made alkaline, when alkaline separations are desired, or it may take place afterwards. The concentration of thioglycollic acid is not critical as long as there is sufficient present to combine with the metal ion.

The use of a water-insoluble adsorbent or filtering aid which does not react with the reactants, such as charcoal or fuller's earth, is advantageous in this process.

I am unable to state the exact composition of all the metal compounds formed by thioglycollic acid in the herein described processes for the removal of heavy metals from water-soluble organic compounds. In some cases, the impurities remain on the filter after the solution is clarified, in some cases they may be found in the filtrate after the soluble organic compounds have been salted out and in some cases, the impurities may be found to remain in part on the clarification filter and in part to pass into the filtrate from the salted out compound. However, many operations of the processes have shown that the impurities do not remain at all in the water-soluble organic compound at the end of the process, or else they are reduced to a surprisingly low value. Any thioglycolates which may be formed could possibly decompose and form insoluble compounds which are not thioglycolates or perhaps inner complexes with heavy metals could be formed which are insoluble in the media employed. However, it appears that where insoluble compounds are formed, they are less soluble than the sulfides and in general they are readily adsorbed on adsorption materials. In almost all cases in which partial purification could be accomplished by forming a sulfide of the metal by the addition of sodium sulfide, better purification was brought about by using thioglycollic acid instead. More satisfactory removal of heavy metals is obtained with the use of thioglycollic acid and an adsorptive material than with the use of the thioglycollic acid alone, but the use of the adsorptive material may sometimes be dispensed with. Other suitable adsorptive materials which may be used are silica gels, activated clays, activated alumina, diatomaceous earth, asbestos, and similar filtering aids.

Dyes which are to be used for certain purposes, such as food colors and cosmetic colors and which contain not more than a very small proportion of certain metals, as for example, not more than 20 parts of lead per million parts of the dye, are desired. This invention effects the removal of such deleterious metals from water-soluble dyes and permits the subsequent use of these dyes for human consumption provided, of course, the dyes themselves are not toxic. Dyes containing copper salts and oxides cannot be used in dyeing rubber in any form because of the rapid decomposition of the rubber in the presence of copper compounds. This invention enables the manufacturer of dyes to remove copper impurities from dyes intended for the coloring of rubber or from the intermediates intended for the manufacture of such dyes. This invention solves the problem of removing heavy metals from water-soluble organic compounds thus broadening the use of certain dyes and intermediates. The use of thioglycollic acid for this purpose appears to be new and unexpected.

This is a continuation-in-part of my application Serial No. 461,499, filed October 9, 1942, now abandoned.

From the foregoing disclosure it will be recognized that the invention is susceptible of modification without departing from the spirit and scope thereof and it is to be understood that the invention is not restricted to the specific illustrations thereof herein set forth.

I claim:

1. The process of treating the water-soluble organic compounds for removing therefrom heavy metal ions of the group consisting of lead, copper and bismuth; which comprises making a reaction mixture by dissolving in water the organic compound to be treated, making the pH value of the solution about 2.0 to about 9.5, adding to the reaction mixture a compound of the group consisting of thioglycollic acid and its alkali metal salts, heating the mixture to a temperature between about 5° C. and its boiling point, clarifying the resulting reaction mixture, and then salting out the water-soluble organic compound from the resulting clarified solution.

2. The process in accordance with claim 1 in which the making of the reaction mixture comprises adding thioglycollic acid.

3. The process in accordance with claim 1 in which the mixture is heated to a temperature between about 75° C. and about 95° C.

4. The process in accordance with claim 1 in which a non-reactive filter aid is added to the reaction mixture.

BOYCE G. CARSON.

REFERENCES CITED

The following references are of record in the file of this patent:

UNITED STATES PATENTS

| Number | Name | Date |
| --- | --- | --- |
| 1,161,866 | Kantzsch | Nov. 30, 1915 |
| 1,644,258 | Lyons | Oct. 4, 1927 |
| 2,049,198 | De Lange | July 28, 1936 |
| 2,070,870 | Speas | Feb. 16, 1937 |
| 2,390,988 | Calingaert | Dec. 18, 1945 |